United States Patent [19]

Sugiyama et al.

[11] Patent Number: 4,798,980
[45] Date of Patent: Jan. 17, 1989

[54] BOOTH'S CONVERSION CIRCUIT

[75] Inventors: Hisashi Sugiyama; Yasuhiro Sugimoto, both of Yokohama; Yukio Kamatani, Kawasaki, all of Japan

[73] Assignee: Kabushiki Kaisha Toshiba, Kawasaki, Japan

[21] Appl. No.: 49,141

[22] Filed: May 13, 1987

[30] Foreign Application Priority Data

Jun. 11, 1986 [JP] Japan .................. 61-135162

[51] Int. Cl.⁴ .................. H03K 19/21; H03K 19/094; H03K 19/017
[52] U.S. Cl. .................. 307/471; 307/243; 307/452
[58] Field of Search .................. 307/448, 451, 452, 453, 307/471, 472, 585, 445, 279, 243; 364/757, 758, 759, 760

[56] References Cited

U.S. PATENT DOCUMENTS

| 4,238,833 | 12/1980 | Ghest et al. | 364/760 |
| 4,570,085 | 2/1986 | Redfield | 307/453 |
| 4,595,845 | 6/1986 | Briggs | 307/450 X |
| 4,649,290 | 3/1987 | Yamamoto | 307/450 X |
| 4,716,312 | 12/1987 | Mead et al. | 307/452 X |

FOREIGN PATENT DOCUMENTS 105732 8/1980 Japan .................. 307/760

OTHER PUBLICATIONS

"CMOS Transfer Gate Exclusive OR Circuit", IBM Tech. Discl. Bull., vol. 28, No. 10, Mar. 1986, pp. 4303–4304.

Craig, "Single-Phase Clocked CMOS Latch", IBM Tech. Discl. Bull., vol. 26, No. 8, pp. 4423–4424, Jan. 1984.

Primary Examiner—John S. Heyman
Assistant Examiner—David R. Bertelson
Attorney, Agent, or Firm—Finnegan, Henderson, Farabow, Garrett & Dunner

[57] ABSTRACT

A Booth's algorithm conversion circuit having first and second switches controlled by input signals QX and Q2X and receiving as input, signals $X_i$ of a logic level positioned in the i digit order of a multiplicand X and signal $X_{i-1}$ of a logic level positioned in the i−1 digit order of multiplicand X. The outputs of the first and second switches are tied together and to ground via first and second transistors controlled by signals QX and Q2X, the first and second transistors conducting in an inverse relationship to the first and second switch circuits. The common output of the first and second switch circuits is input to an exclusive OR circuit which receives an additional logic 1 or logic 0 input signal to produce the Booth's converted output. The resulting number of circuit elements and gates provides a simplified, high speed and small circuit for producing the Booth's conversion.

6 Claims, 3 Drawing Sheets

| QX | Q2X | N | QB |
|----|-----|---|-----|
| 0 | 0 | 0 | 0 |
| 1 | 0 | 0 | $X_i$ |
| 0 | 1 | 0 | $X_{i-1}$ |
| 0 | 0 | 1 | 1 |
| 1 | 0 | 1 | $\overline{X_i}$ |
| 0 | 1 | 1 | $\overline{X_{i-1}}$ |

| QX | Q2X | N | QB |
|---|---|---|---|
| 0 | 0 | 0 | 0 |
| 1 | 0 | 0 | Xi |
| 0 | 1 | 0 | Xi-1 |
| 0 | 0 | 1 | 1 |
| 1 | 0 | 1 | $\overline{Xi}$ |
| 0 | 1 | 1 | $\overline{Xi-1}$ |

BOOTH'S CONVERSION CIRCUIT

BACKGROUND OF THE INVENTION

This invention relates to a Booth's conversion circuit involving Booth's algorithm. Generally, Booth's conversion can be expressed by the following theoretical formula:

$$QB = N \oplus (QX \cdot X_i + Q2X \cdot X_{i-1}) \quad (1)$$

where:
- QB = a converted value,
- N = logic 1 or logic 0,
- QX, Q2X = the logic values of multipliers, represented by logic 1 or logic 0
- $X_i$ = the logic value of a signal positioned in the i digit order involved in a multiplicand X, and
- $X_{i-1}$ = the logic value of a signal positioned in the $X_{i-1}$ digit order involved in a multiplicand X, and
- $\oplus$ denotes an exclusive logical sum, and · represents a logical product.

Formula (1) may be converted into following formula (2)

$$QB = N \oplus \left( \overline{\overline{(QX \cdot X_i) \cdot \overline{(Q2X \cdot X_{i-1})}}} \right) \quad (2)$$

FIG. 1 represents a logic circuit in the form of a logically symbolized diagram, which operates according to theoretical formula (2).

Reference numerals 11 to 13 given in FIG. 1 each denote a two-input NAND gate, and reference numeral 14, also in FIG. 1, represents a two-input exclusive OR gate. Signals QX and $X_i$ are input to the input terminals of NAND gate 11. Signals Q2X and $X_{i-1}$ are input to the input terminals of NAND gate 12. Output signals of NAND gates 11 and 12 are input to input terminals of NAND gate 13. An output signal of NAND gate 13 is input to one input terminal of exclusive OR gate 14. Signal N is input to the other input terminal of exclusive OR gate 14. OR gate 14 outputs Booth-converted signal QB.

FIG. 2 is a diagram of the logic circuit of FIG. 1.

Referring to FIG. 2, portions therein which correspond to those of FIG. 1 are denoted by the same reference numerals.

NAND gate 11 is formed of P channel type MOS transistors 15, 16 and N channel type MOS transistors 17, 18. NAND gate 12 is composed of P channel type MOS transistors 19, 20 and N channel type MOS transistors 21, 22. NAND gate 13 is composed of P channel type MOS transistors 23, 24 and N channel type MOS transistors 25, 26.

Exclusive OR gate 14 comprises P channel type MOS transistors 27 to 29, and N channel type MOS transistors 30 to 32.

NAND gate 11 receives signals QX, $X_i$. NAND gate 12 is supplied with signals Q2X, $X_{i-1}$. Outputs from NAND gates 11, 12 are delivered to NAND gate 13. An output from NAND gate 13 and signal N are supplied to exclusive OR gate 14. Booth-converted output QB is obtained from exclusive OR gate 14.

The operation of the Booth's conversion circuit shown in FIG. 2 will now be described.

Now, let it be assumed that signals QX, $X_i$ have a high level ("H"). In this case, MOS (metal oxide semiconductor) transistors 15, 16 are rendered nonconductive, whereas MOS transistors 17, 18 are rendered conductive. As a result, the drain potential of MOS transistor 17 falls to ground potential (low potential). In other words, a low ("L") level signal is output from NAND gate 11.

When signal $X_i$ has low ("L") level and QX has high ("H") level, MOS transistors 15, 17 are rendered conductive, while MOS transistors 16, 18 are rendered nonconductive. Consequently, the source potential of MOS transistor 17 is allowed to float because of the nonconductive state of MOS transistor 18. The drain potential of MOS transistor 15 is raised to high level, i.e., high power source potential $V_{DD}$. As a result, an output signal from NAND gate 11 has high ("H") level.

When signal QX has low ("L") level and signal $X_i$ has high ("H") level, MOS transistors 16, 18 are rendered conductive, whereas MOS transistors 15, 17 are rendered nonconductive. The drain potential of MOS transistor 18 remains floating because of the nonconductive condition of MOS transistor 17. The drain potential of MOS transistor 16 holds $V_{DD}$ potential, in which case an output signal from NAND gate 11 has a high potential.

When signals QX, $X_i$ both have low ("L") level, MOS transistors 15, 16 are rendered conductive, and MOS transistors 17, 18 are rendered nonconductive. As a result, the drain potential of MOS transistors 15, 16 is raised to $V_{DD}$ potential, and an output from NAND gate 11 has high level.

As is mentioned above, NAND gate 11 emits an output having low ("L") level when two input signals have high ("H") level, and outputs a signal having high ("H") level, in other cases.

NAND gates 12, 13 are substantially the same in their structure and operation.

Now, let it be assumed that signals Q2X, $X_{i-1}$ have high level ("H"). In this case, MOS transistors 19, 20 are rendered nonconductive, whereas MOS transistors 21, 22 are rendered conductive. As a result, the drain potential of MOS transistor 21 falls to ground potential (low potential). In other words, a low ("L") level signal is output from NAND gate 12.

When signal $X_{i-1}$ has low ("L") level and Q2X has high ("H") level, MOS transistors 19, 21 are rendered conductive, while MOS transistors 20, 22 are rendered nonconductive. Consequently, the source potential of MOS transistor 21 is allowed to float because of the nonconductive state of MOS transistor 22. The drain potential of MOS transistor 19 is raised to high level, i.e., high power source potential $V_{DD}$. As a result, an output signal from NAND gate 12 has high ("H") level.

When signal Q2X has low ("L") level, and signal $X_{i-1}$ has high ("H") level, MOS transistors 20, 22 are rendered conductive, whereas MOS transistors 19, 21 are rendered nonconductive. The drain potential of MOS transistor 22 retains floating because of the nonconductive condition of MOS transistor 21. The drain potential of MOS transistor 20 holes $V_{DD}$ potential, in which case, an output signal from NAND gate 12 has a high potential.

When signals Q2X, $X_{i-1}$ both have low ("L") level, MOS transistors 19, 20 are rendered conductive, and MOS transistors 21, 22 are rendered nonconductive. As a result, the drain potential of MOS transistors 19, 20 is raised to $V_{DD}$ potential, and an output from NAND gate 12 has high level.

Now, let it be assumed that signals output from NAND gates 11, 12 have high level ("H"). In this case, MOS transistors 23, 24 are rendered nonconductive, whereas MOS transistors 25, 26 are rendered conductive. As a result, the drain potential of MOS transistor 25 falls to ground potential (low potential). In other words, a low ("L") level signal is output from NAND gate 13.

When the output signal of NAND gate 11 has low ("L") level and the output signal of NAND gate 12 has high ("H") level, MOS transistors 23, 25 are rendered conductive, while MOS transistors 24, 26 are rendered nonconductive. Consequently, the source potential of MOS transistor 25 is allowed to float because of the nonconductive state of MOS transistor 26. The drain potential of MOS transistor 23 is raised to high level, i.e., high potential $V_{DD}$. As a result, an output signal from NAND gate 13 has high ("H") level.

When the output signal of NAND gate 11 has low ("L") level, and the output signal of NAND gate 12 has high ("H") level, MOS transistors 24, 26 are rendered conductive, whereas MOS transistors 23, 25 are rendered nonconductive. The drain potential of MOS transistor 26 retains floating because of the nonconductive condition of MOS transistor 25. The drain potential of MOS transistor 24 holds $V_{DD}$ potential, in which case, an output signal from NAND gate 13 has a high potential.

When the output signals of NAND gates 11, 12 both have low ("L") level, MOS transistors 23, 24 are rendered conductive, and MOS transistors 25, 26 are rendered nonconductive. As a result, the drain potential of MOS transistors 23, 24 is raised to $V_{DD}$ potential, and an output from NAND gate 13 has high level.

When an output from NAND gate 13 and signal N both have high ("H") level, MOS transistors 30, 31 are rendered conductive, and MOS transistors 27-29 are rendered noncon-ductive. The drain potential of MOS transistor 30 is reduced to the ground potential. The source of MOS transistor 31 and the gate of MOS transistor 32 are grounded via MOS transistor 30, and have low "L" level. As a result, MOS transistor 32 is rendered nonconductive, and the drain of MOS transistor 31 is connected to the ground potential. Therefore, exclusive OR gate 14 emits output signal QB having low ("L") level.

When, on the other hand, an output signal from NAND gate 13 and signal N both have low ("L") level, MOS transistors 27-29 are rendered conductive and MOS transistors 30-31 are rendered nonconductive. As a result, the drain potential of MOS transistor 27 is raised to high potential $V_{DD}$, and the high ("H") level signal is supplied to the source of MOS transistor 31 and the gate of MOS transistor 32. When MOS transistor 32 is rendered conductive upon receipt of the high ("H") level signal, the source of MOS transistor 32 is reduced to low ("L") level. The drain of transistor 32 also falls to low ("L") level. The drain potential of MOS transistor 29 is also reduced to low ("L") level because the source of MOS transistor 29 has low ("L") level. Since the drain potential of MOS transistors 29, 32 falls to low ("L") level, an output signal QB from exclusive OR gate 14 has low ("L") level.

When an output signal from NAND gate 13 has high ("H") level, and signal N has low ("L") level, MOS transistors 30, 28 are rendered conductive, and MOS transistors 27, 29, 31 are rendered nonconductive. As a result, the drain potential of MOS transistor 30 falls to ground level. The gate potential of MOS transistor 32 falls to low ("L") level, causing MOS transistor 32 to be rendered nonconductive. On the other hand, the drain potential of MOS transistor 28 has high ("H") level, because the source potential of MOS transistor 28 has high ("H") level and the gate potential has low ("L") level.

As a result, an output signal QB from exclusive OR gate 14 has high ("H") level.

When an output signal from NAND gate 13 has low ("L") level and signal N has high ("H") level, MOS transistors 27, 29, 31 are rendered conductive, and MOS transistors 30, 28 are rendered nonconductive. When rendered conductive, MOS transistor 27 has its drain potential raised to high ("H") level. MOS transistor 32 is rendered conductive, because its gate is supplied with the high ("H") level signal from the drain of MOS transistor 27.

Since, on the other hand, the sources of transistors 29, 32 are supplied with high level ("H") signal, the drain potentials of MOS transistors 29, 32 have high ("H") level.

Consequently, output signal QB from exclusive OR gate 14 has high ("H") level.

As can be clearly understood from the above, only when it is supplied with two input signals having different voltage levels (namely, one input signal having high ("H") level and the other signal having low ("L") level), does exclusive OR gate 14 output a high ("H") level signal. When both input signals have the same voltage level (namely, both input signals have either high ("H") or low ("L") level), exclusive OR gate 14 issues a low ("L") level signal, thereby acting as an exclusive logical sum circuit.

NAND gates 11 to 13 and exclusive OR gate 14 cooperate to perform Booth's conversion.

However, since, in the conventional Booth's conversion circuit, as can be seen from FIGS. 1 and 2, an output signal is emitted via three logic circuit stages (a stage of NOR gates 11, 12, a stage of NOR gate 13, and a stage of exclusive OR circuit 14), a time delay corresponding to the total of the time periods spent in the three stages occurs before a Booth-converted output is produced, thus rendering the conventional Booth's conversion circuit unsuitable for high-speed operation. Since four logic circuits, i.e., 11, 12, 13, and 14 are involved, the conventional Booth's conversion circuit involves a large circuit system, occupying a considerable proportion of an integrated circuit chip. In particular, when Booth's algorithm is applied, the multiplier circuit has to be provided with numerous Booth's conversion circuits, with the result that the multiplier device occupies a large area on the semiconductor chip.

This invention has been accomplished in view of the above-mentioned circumstances, and is intended to provide a Booth's conversion circuit which ensures a high-speed operation and occupies a small space.

According to the invention, an improved Booth's conversion circuit is provided, which comprises:

a first switch circuit, which is supplied at one end with signal $X_i$ of a logic level positioned in the i digit order of a multiplicand X, and which is rendered conductive or nonconductive according to the logic level of signal QX of logic 1 or logic 0;

a second switch circuit, which is supplied at one end with signal $X_{i-1}$ of a logic level positioned in the i−1 digit order of the multiplicand X, and which is connected at the other end to the opposite end of the first switch circuit, and is rendered conductive or nonconductive according to the logic level of signal Q2X of logic 1 or logic 0;

first and second transistors which are connected in series between the junction of the other ends of the first and second switch circuits and a reference potential, and which are rendered conductive or nonconductive according to the logic levels of signals QX, Q2X; and an exclusive logic sum circuit which is connected at one end to the junction of the first and second switch circuits, and at the other end to a signal of logic 1 or logic 0.

In the Booth's conversion circuit embodying the present invention, the first and second transistors are rendered conductive or nonconductive in an inverse relationship with the first and second switch circuits. The junction of the output terminals of the first and second switch circuits has the same logic level as an output from NAND gate 13 shown in FIG. 1. Therefore, the number of elements and gates can be greatly reduced, thereby enabling the Booth's conversion circuit according to the present invention to be operated at high speed and to occupy a much smaller space than the conventional Booth's conversion circuit.

DETAILED DESCRIPTION OF THE PREFERRED EMBODIMENT

Figures 3, 4:
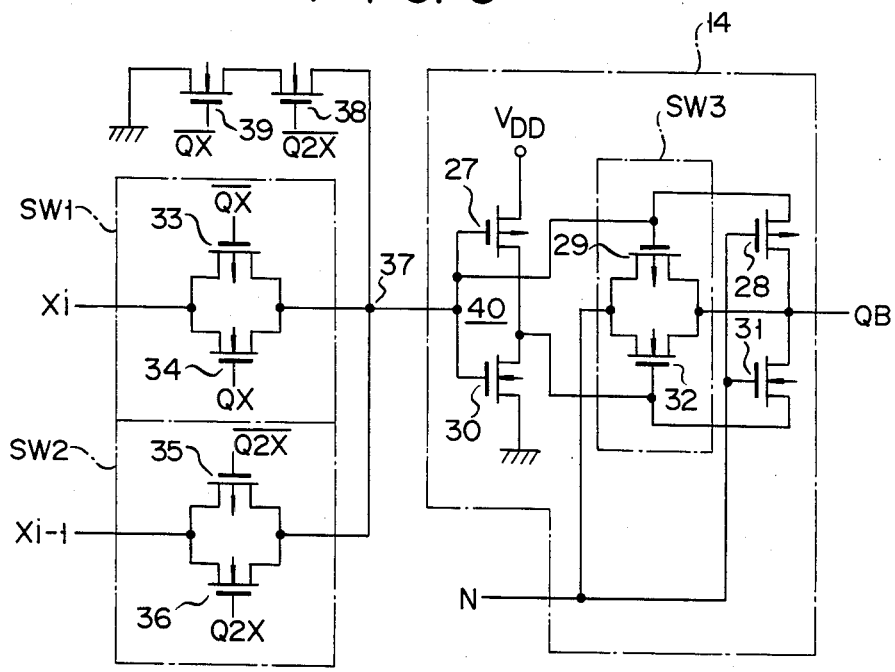
FIG. 3 shows a Booth's conversion circuit according to an embodiment of the present invention.
FIG. 4 is a truth table applied in the operating of the Booth's conversion circuit of FIG. 3.

Description may now be made with reference to FIG. 3 of Booth's conversion circuit embodying the present invention.

The input terminal of switch circuit $SW_1$ composed of a parallel circuit of P channel type MOS (metal oxide semiconductor) transistor 33 and N channel type MOS transistor 34, namely one end of the junction of transistors 33, 34, is supplied with signal $X_i$ of a logic level, positioned in the i digit order of a multiplicand.

The input terminal of a switch circuit $SW_2$ composed of a parallel circuit of P channel type MOS transistor 35 and N channel type MOS transistor 36, namely one end of the junction of transistors 35, 36, is supplied with a signal $X_{i-1}$ of a logic level, positioned in the i−1 digit order of the multiplicand. The gate of MOS transistor 33 is supplied with logic signal $\overline{QX}$ of logic 1 or logic 0. The gate of MOS transistor 34 is supplied with logic signal $\overline{QX}$ of logic 1 or logic 0. The gate of MOS transistor 35 is supplied with logic signal Q2X of logic 1 or logic 0, and the gate of MOS transistor 36 is supplied with logic signal $\overline{Q2X}$ of logic 1 or logic 0.

The output terminal of switch circuit $SW_1$, namely, the other end of the junction of transistors 33, 34, is connected to the output terminal of switch circuit $SW_2$ namely, the other end of the junction of transistors 35, 36.

N channel MOS transistor 38 whose gate is supplied with logic signal $\overline{Q2X}$ and N channel MOS transistor 39 whose gate is supplied with control signal $\overline{QX}$ are connected in series between junction 37 of the output terminals of switch circuits $SW_1$ and $SW_2$ and the ground.

One of the input terminals of exclusive OR gate 14 is connected to junction 37. The output terminal of exclusive OR gate 14 outputs Booth-converted signal QB.

Exclusive OR gate 14 comprises P channel type MOS transistors 27, 28, 29, and N channel type MOS transistors 30, 31, 32.

Junction 37 is connected to the gates of P channel type MOS transistor 27 and N channel type transistor 30 which are connected in series between high potential power source $V_{DD}$ and the ground. MOS transistors 27, 30 jointly constitute CMOS (complementary MOS) inverter 40. The junction between the gates of MOS transistors 27, 30 forms one input terminal of inverter 40.

The gate of P channel type MOS transistor 29 and the source of P channel type MOS transistor 28 are connected to junction 37.

The gate of N channel type MOS transistor 32 and the source of N channel type MOS transistor 31 are connected to the junction of the drain-source paths of MOS transistors 27, 30.

MOS transistors 29, 32 connected in parallel jointly constitute switch circuit $SW_3$. The input terminal of switch circuit $SW_3$, that is, one of the junctions of transistors 29, 32, is supplied with signal N having logic level "1" or "0". The input terminal of switch circuit $SW_3$ for receiving signal N constitutes the other input terminal of exclusive OR circuit 14.

The drains of MOS transistors 28, 31 are connected to the output terminal of switch circuit $SW_3$, that is, the other junction between transistors 29, 32. The gates of MOS transistors 28, 31 are supplied with signal N.

Booth-converted output signal QB is obtained from the junction of MOS transistors 28, 31, which constitutes the output terminal of exclusive OR circuit 14 and, thus, the output terminal of Booth's conversion circuit.

The Booth's conversion circuit of the present invention, shown in FIG. 3, will now be described.

Now, let it be assumed that signals $X_i$ and $X_{i-1}$ have low ("L") level and signals QX, Q2X also have low ("L") level. In this case, MOS transistors 33–36 are rendered nonconductive, and MOS transistors 38, 39 are rendered conductive. Since MOS transistors 33–36 are rendered nonconductive, signals $X_i$ and $X_{i-1}$ are not transmitted via switch circuits $SW_1$, $SW_2$. As a result, the potential of junction 37 is reduced to low ("L") level (ground level) through transistors 38, 39.

The low ("L") level signal of junction 37 is supplied to the input terminal of CMOS inverter 40, namely, the junction of the gates of MOS transistors 27, 30. As a result, P channel type MOS transistor 27 is rendered conductive, and N channel type MOS transistor 30 is rendered nonconductive. Therefore, a high ("H") level signal is output from the output terminal of CMOS inverter 40, namely, the junction of the drain-source paths of transistors 27, 30. As a result, MOS transistors 29, 32 of switch circuit $SW_3$ are rendered conductive.

If, at this time, signal N has low ("L") level, then this low signal is supplied to the junction of the drains of MOS transistors 28, 31 through switch circuit $SW_3$. Since, on the other hand, the gates of MOS transistors 28, 31 are supplied with signal N having low ("L") level, MOS transistor 28 is rendered conductive and MOS transistor 31 is rendered nonconductive. Since the source of MOS transistor 28 has low ("L") level and the junction of the drains of transistors 28, 31 is supplied with signal N having low ("L") level through switch circuit SW$_3$, output signal QB has low ("L") level.

Now, let it be assumed that signal QX has a high ("H") level (signal $\overline{QX}$ has low ("L") level) and other signals have the same level as mentioned above (namely, signals $\overline{Q2X}$, $\overline{X_i}$ and $\overline{X_{i-1}}$ have low ("L") level). In this case, switch circuit SW$_1$ is rendered conductive, and switch circuit SW$_2$ is rendered nonconductive. Since, on the other hand, MOS transistor 39 is rendered nonconductive, signal $\overline{X_i}$ is supplied to the input terminal of CMOS inverter 40 via switch circuit SW$_1$.

If, at this time, signal N has low ("L") level, the low ("L") level signal is supplied to the input terminal of switch SW$_3$. The low level N signal is also applied to the gates of MOS transistors 28, 31 causing MOS transistor 28 to be rendered conductive and MOS transistor 31 to be rendered nonconductive. Since the source of MOS transistor 28 is connected to the input terminal of CMOS inverter 40, the drain of MOS transistor 28 is supplied with low ("L") level signal $\overline{X_i}$. Since signal $\overline{X_i}$ now has low ("L") level, switch SW$_3$ is rendered conductive. Consequently, signal $\overline{X_i}$ is output as signal QB via switch circuit SW$_3$.

When signal Q2X has high ("H") level (signal $\overline{Q2X}$ has low ("L") level), and signal QX has low ("L") level (signal $\overline{QX}$ has high ("H") level), switch circuit SW$_2$ is rendered conductive and switch circuit SW$_1$ is rendered nonconductive. MOS transistor 39 is rendered conductive, and MOS transistor 38 is rendered nonconductive. Therefore, the input terminal of CMOS inverter 40 is supplied with signal $\overline{X_{i-1}}$.

If, at this time, signal N has low ("L") level, MOS transistor 28 is rendered conductive, and MOS transistor 31 is rendered nonconductive. Since the source of MOS transistor 28 is connected to the input terminal of CMOS inverter 40, the drain of MOS transistor 28 is supplied with signal $\overline{X_{i-1}}$. Therefore, output signal QB is represented by signal $\overline{X_{i-1}}$.

When both signals QX, Q2X have low ("L") level, switch circuits SW$_1$, SW$_2$ are rendered nonconductive, and MOS transistors 38, 39 are rendered conductive. Consequently, the input terminal of CMOS inverter 40 is supplied with low ("L") level signal. As a result, MOS transistors 29, 32 involved in switch circuit SW$_3$ are rendered conductive.

If, at this time, signal N has high ("H") level, the input terminal of switch circuit SW$_3$ is supplied with the high ("H") level signal. MOS transistors 28, 31 are also supplied with the high ("H") N level signal. As a result, MOS transistor 31 is rendered conductive, and MOS transistor 28 is rendered nonconductive. Therefore, the output terminal of switch circuit SW$_3$ outputs high ("H") level signal. The source of MOS transistor 31 is supplied with the high ("H") level signal of CMOS inverter 40. Therefore, the drain of MOS transistor 31 also receives a high ("H") level signal. In other words, output signal QB has high ("H") level.

When signal QX has high ("H") level, and signal Q2X has low ("L") level, switch circuit SW$_1$ is rendered conductive and switch circuit SW$_2$ is rendered nonconductive. At the same time, MOS transistor 38 is rendered conductive and MOS transistor 39 is rendered nonconductive. Consequently the input terminal of CMOS inverter 40 is supplied with signal X$_i$.

If, at this time signal N has high ("H") level, the high ("H") level signal is supplied to the input terminal of switch circuit SW$_3$. The high level N signal is also delivered to the gates of MOS transistors 28, 31. As a result, MOS transistor 31 is rendered conductive, and MOS transistor 28 is rendered nonconductive. Since the source of MOS transistor 31 is connected to the output terminal of CMOS inverter 40, the source of MOS transistor 31 is supplied with signal $\overline{X_i}$ obtained by the inversion of signal $X_i$, and signal $\overline{X_i}$ delivered to the drain of MOS transistor 31. When signal $\overline{X_i}$ has high ("H") level, switch circuit SW$_3$ is rendered conductive. As a result, the high ("H") level N signal is transmitted, and output signal QB is represented by $\overline{X_i}$.

When signal Q2X has high ("H") level and signal QX has low ("L") level, then switch circuit SW$_2$ is rendered conductive and switch circuit SW$_1$ is rendered nonconductive. MOS transistor 39 is rendered conductive and MOS transistor 38 is rendered nonconductive. As a result, the input terminal of CMOS inverter 40 is supplied with signal X$_{i-1}$.

If, at this time, signal N has high ("H") level, the high (High) level signal is supplied to the input terminal of switch circuit SW$_3$. At the same time, the gates of MOS transistors 28, 31 are supplied with the high ("H") level N signal. As a result, MOS transistor 31 is rendered conductive, and MOS transistor 28 is rendered nonconductive. Since the source of MOS transistor 31 is connected to the output terminal of CMOS inverter, the source of MOS transistor 31 is supplied with signal $\overline{X_{i-1}}$ by the inversion of signal X$_{i-1}$. The drain of MOS transistor 31 is supplied with signal X$_{i-1}$. Switch circuit SW$_3$ is rendered conductive when signal X$_{i-1}$ has high ("H") level. At this time the high ("H") level N signal is transmitted to the output terminal of switch circuit SW$_3$. Therefore, output signal QB is represented by $\overline{X_{i-1}}$.

All the aforementioned operations are graphically illustrated in Table 4.

The operations shown in the truth table of FIG. 4 are based on the aforementioned logical formula (1). The logical circuit of FIG. 3 produces a Booth-converted output.

Figure 1:
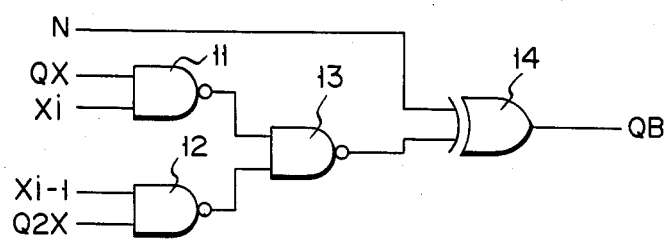
FIG. 1 is a logically symbolized diagram of a Booth's conversion circuit performing the logic formula involved in Booth's conversion.
Figure 2:
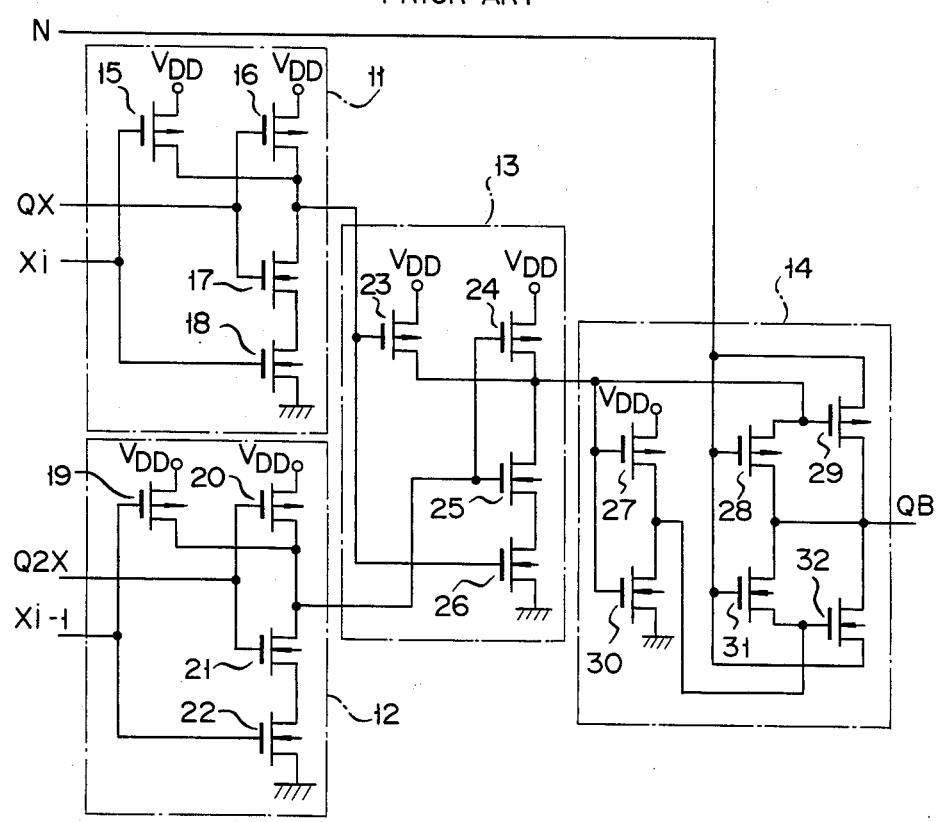
FIG. 2 is a diagram showing Booth's conversion circuit of FIG. 1.

The Booth's conversion circuit of this invention offers the advantages that, though the conventional Booth's conversion circuit of FIG. 1 comprises 18 elements and entails a delay time of 4.7 n seconds, the present invention comprises only 12 elements and the delay time is reduced to 2.6 n seconds, thus making it possible to reduce the number of elements by about 33% and shorten the delay time by about 55%.

The aforementioned embodiment of the present invention refers to the CMOS arrangement.

However, the invention is not limited to this example, but is applicable in various modifications thereof.

Figure 5:
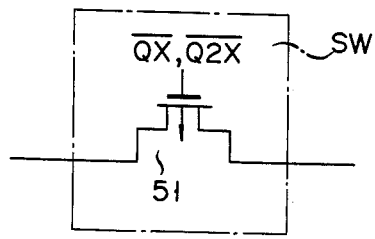
FIGS. 5 and 6 illustrate modifications of a switch circuit used in the Booth's conversion circuit of FIG. 3.
Figure 6:
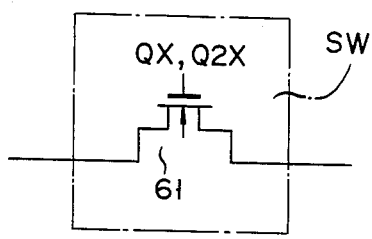

In the embodiment, switch circuits SW$_1$ and SW$_2$ each include transmission gates comprised of a P channel type MOS transistor and an N channel type MOS transistor. As is shown in FIG. 5, however, it is possible for circuit SW$_1$ and SW$_2$ each to have only one P channel type MOS transistor 51, or, as is shown in FIG. 6, only one N channel type MOS transistor 61.

When only one P channel type MOS transistor 51 is used for switch circuit SW1, the gate of MOS transistor 51 is supplied with signal $\overline{QX}$. Also when only one P channel type MOS transistor 51 is used for switch circuit SW2, the gate of MOS transistor 51 is supplied with signal $\overline{Q2X}$. Similarly, when only one N channel type MOS transistor 61 is used for switch circuit SW1; the gate of MOS transistor 61 is supplied with signal QX.

Likewise, when only one N channel type MOS transistor 61 is used for switch circuit SW2, the gate of MOS transistor 61 is supplied with signal Q2X.

Further, if it is possible to obtain an exclusive logical sum, exclusive OR gate 14 may be formed of a different type.

As has been described above, the present invention can provide a Booth's conversion circuit which occupies a small area and can be operated at high speed.

What is claimed is:

1. A Booth's conversion circuit comprising:
   a first switch circuit having an input terminal which is supplied with signal $X_i$ of a logic level positioned in the i-digit position of a multiplicand X, and which is rendered conductive or nonconductive according to the logic level of a signal QX of logic 1 or logic 0;
   a second switch circuit, having an input terminal which is supplied with signal $X_{i-1}$ of a logic level positioned in the i-1 digit position of a multiplicand, having an output terminal which is connected to the output terminal of said first switch circuit, and which is rendered conductive or nonconductive according to the logic level of a signal Q2X of logic 1 or logic 0;
   first and second transistors connected in series between the junction of said output terminals of said first and second switches and a reference potential, and which are rendered conductive or nonconductive according to the logic levels of signals QX, Q2X, the conductive and nonconductive states of said first and second switches being reversed from those of said first and second transistors; and
   an exclusive logical sum circuit, having a first input terminal connected to said junction of said first and second switch circuits, and having a second input terminal supplied with a signal having a logic level 1 or 0.

2. The Booth's conversion circuit according to claim 1, wherein said first switch circuit comprises a parallel circuit of a P channel type MOS transistor and an N channel type MOS transistor.

3. The Booth's conversion circuit according to claim 1, wherein said second switch circuit comprises a parallel circuit of a P channel type MOS transistor and an N channel type MOS transistor.

4. The Booth's conversion circuit according to claim 1, wherein said first switch circuit comprises a P type channel type MOS transistor.

5. The Booth's conversion circuit according to claim 1, wherein said first switch circuit comprises an N channel type MOS transistor.

6. The Booth's conversion circuit according to claim 1, wherein said exclusive logical sum circuit comprises:
   a CMOS inverter which includes a P channel type transistor and an N channel type transistor, connected in series between a high potential and a low potential, the gates of said P and N channel type transistors being connected together to constitute an input terminal, and the junction of the drain-source paths of said P and N channel type transistors constituting the output terminal of said CMOS inverter;
   a third switch circuit which includes a parallel-connected circuit of a P channel type MOS transistor so controlled as to be rendered conductive or nonconductive according to the potential level of said input terminal of said CMOS inverter, and an N channel type MOS transistor so controlled as to be rendered conductive or nonconductive according to the potential level of said output terminal of said CMOS inverter; and
   a circuit including a P channel type transistor and an N channel type transistor connected in series between said input terminal and output terminal of said CMOS inverter, said P channel type transistor and N channel type transistor being so controlled as to be rendered conductive or nonconductive according to the logic level "1" or "0" of a signal supplied to the gates of said P and N channel type transistors, and the junction of the drain-source paths of said P channel type transistor and N channel type transistor being connected to the output terminal of said third switch circuit.

* * * * *